United States Patent Office 2,957,864
Patented Oct. 25, 1960

2,957,864

ERYTHROMYCIN RECOVERY AND UPGRADING PROCESS

Maxton F. Murray, Kalamazoo Township, Kalamazoo County, Mich., assignor to The Upjohn Company, Kalamazoo, Mich., a corporation of Michigan No Drawing. Filed July 30, 1954, Ser. No. 446,976

12 Claims. (Cl. 260—210)

This invention relates to a process and is particularly directed to a process in which erythromycin is purified by contacting a substantially anhydrous solution of impure erythromycin with a dicarboxylic inner anhydride.

This application is a continuation-in-part of my co-pending applications Serial No. 369,962, filed July 23, 1953, and Serial No. 394,888, filed November 27, 1953.

Erythromycin, an antibiotic having therapeutic utility, is prepared by culturing *Streptomyces erythreus* NRRL 2338 in an erythromycin substrate medium and isolated by multiple solvent extraction and crystallization, as more particularly set forth in U.S. Patent 2,653,899, granted September 29, 1953.

It has now been found that isolation and/or upgrading of erythromycin is greatly facilitated by contacting a substantially anhydrous solution of impure erythromycin, such as is ordinarily obtained in the multiple solvent extraction, with a dicarboxylic inner anhydride and separating the erythromycin acid ester. The obtained acid ester has erythromycin activity, i.e., shows the same antibacterial spectrum as erythromycin, and can be used as such instead of erythromycin free base or it can be hydrolyzed with aqueous alkali to give erythromycin free base. By the process of the invention, it is thus possible to facilitate isolation of erythromycin from its fermentation beers and to upgrade impure grades of erythromycin which heretofore could not readily, if at all, be worked up into a specification grade product.

In carrying out the processes of the invention any dicarboxylic inner anhydride can be used. The term "dicarboxylic inner anhydride" is used herein to designate anhydrides which are obtained by intramolecular abstraction of water from the two carboxyl groups of a dicarboxylic acid according to the equation:

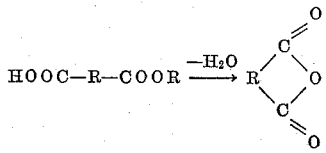

Thus R is the radical obtained by the removal of the two carboxyl groups from a dicarboxylic acid which is capable of being dehydrated to an inner anhydride.

It is well known that dicarboxylic inner anhydrides as a class are alcoholized readily by compounds having active hydroxyl hydrogen to form acid esters. All that is necessary to effect the process of this invention, therefore, is to add the anhydride to the substantially anhydrous solution of erythromycin and to separate the erythromycin acid ester which forms. As is well known, the dicarboxylic inner anhydrides which so react with active hydroxyl hydrogen can contain a five-, six-, or seven-membered ring structure, such as are exemplified by succinic anhydride, glutaric anhydride, and adipic anhydride, respectively, and the corresponding unsaturates such as maleic anhydride. While these simpler and more readily available dicarboxylic inner anhydrides will ordinarily be used, it is to be understood that more complicated anhydrides can be used such as those in which the ring structure is substituted by alkyl, alkenyl, alkylidene, alkoxy, and halo groups, or which comprise bicyclic and polycyclic groups such as are obtained by the diene synthesis from maleic anhydride and conjugated dienes such as butadiene, cyclopentadiene, furan, and the like. Advantageously the dicarboxylic inner anhydride is succinic anhydride, glutaric anhydride, or a like lower dicarboxylic inner anhydride. Typical examples of such anhydrides in which R in the above formula is a divalent radical containing not more than six carbon atoms are: succinic anhydride and derivatives thereof, such as, methylsuccinic anhydride, dimethylsuccinic anhydride (symmetrical and unsymmetrical), mono- and di-, chloro- and bromosuccinic anhydrides, α,β-dichloro-α,β-dimethylsuccinic anhydride, α,β-dimethoxysuccinic anhydride, α,β-diethoxysuccinic anhydride, methoxysuccinic anhydride, ethoxysuccinic anhydride, itaconic anhydride, homoitaconic anhydride, and alkenylsuccinic anhydrides, such as allylsuccinic anhydride, isobutenylsuccinic anhydride, and the like; maleic anhydride and derivatives thereof, such as, citraconic anhydride, homocitraconic anhydride (ethylmaleic anhydride), pyrocinchonic anhydride (dimethylmaleic anhydride), xeronic anhydride (diethylmaleic anhydride), ethoxymaleic anhydride, chloromaleic anhydride, dichloromaleic anhydride, ethylmethylmaleic anhydride, and the like; thiodiglycolic anhydride; cyclobutane - 1,2 - dicarboxylic anhydride; iminodiacetic anhydride (diglycoloimide); 1,2-cyclopentanedicarboxylic anhydride; 1,2 - dimethyl - 1,2 - cyclopropanedicarboxylic anhydride; 1-cyclopentene-1,2-dicarboxylic anhydride; phthalic anhydride; glutaric anhydride and derivatives thereof, such as, α-methylglutaric anhydride, β-methylglutaric anhydride, α-ethylglutaric anhydride, β-ethylglutaric anhydride, α,α-dimethylglutaric anhydride, α,β-dimethylglutaric anhydride, α,γ-dimethylglutaric anhydride, β,β-dimethylglutaric anhydride, α- isopropylglutaric anhydride, β-isopropylglutaric anhydride, α-propylglutaric anhydride, β-propylglutaric anhydride, α-ethyl-β-methylglutaric anhydride, β-ethyl-β-methylglutaric anhydride, α,α,β-trimethylglutaric anhydride, α,α,γ-trimethylglutaric anhydride, α,β,β-trimethylglutaric anhydride, α,β,γ-trimethylglutaric anhydride, and the like, and like dicarboxylic acid anhydrides containing from four to eight carbon atoms. Other dicarboxylic inner anhydrides that can be utilized in the process of the invention include benzylsuccinic anhydride, 2,4-dimethoxyphenylsuccinic anhydride, N-benzoylaspartic anhydride, phenylsuccinic anhydride, cyclohexylsuccinic anhydride, cyclohexenylsuccinic anhydride, cyclopentylsuccinic anhydride, octenylsuccinic anhydrides, e.g., diisobutenylsuccinic anhydride, nonenylsuccinic anhydrides, e.g., tripropenylsuccinic anhydride, 3-phenylallylsuccinic anhydride, 2,5-hexadien-1-ylsuccinic anhydride, and the like; phenyl and p-chlorophenylmaleic anhydride, hexahydrophthalic anhydride, Δ⁴-cis-tetrahydrophthalic anhydride, Carbic anhydride (3,6-endomethylene-4-cyclohexene-1,2-dicarboxylic anhydride), 7-oxabicyclo-[2,2,1]-5-heptene-2,3-dicarboxylic anhydride (furanmaleic anhydride adduct), pyromellitic anhydride, and the like; naphthalic anhydride; diglycolic anhydride; 3-terpinolenesuccinic anhydride; 3,5-diethoxy-2,4-cyclohexadiene-1,2-dicarboxylic anhydride; 1,2,3,4-tetrahydro-3-methyl-6,7-methylenedioxy-1,2-naphthalene dicarboxylic anhydride (the maleic anhydride adduct of isosafrole); homophthalic anhydride; cinchomeronic anhydride; quinolinic anhydride; 4 - tertiarybutylmercapto-5-methyl - 4 - cyclohexene-1,2-dicarboxylic anhydride; 1,2-cyclopentanedicarboxylic anhydride; β-isobutylglutaric anhydride, α,α-diethylglutaric anhydride, α-methyl-β-isopropylglutaric anhydride, β-methyl-β-isopropylbutaric anhydride, α-ethyl- β,β-dimethylglutaric anhydride, α,α,β,β-tetramethylglutaric anhydride, α,α,γ,γ-tetramethylglutaric anhydride, α,β,β,γ-tetramethylglutaric anhydride, β-amylglutaric anhydride, α-methyl-γ-isobutylglutaric anhydride, β-ethyl-β-propylglutaric anhydride, β-methyl-β-butylglutaric anhydride, β-methyl-β-isobutylglutaric anhydride, and the like.

The process of the invention is particularly useful in isolating erythromycin from its fermentation beer. A suitable procedure is to extract the fermentation beer with amyl acetate at a pH of about 10, suitably from about pH 9.5 to about pH 10.5, and then extract the amyl acetate solution with an aqueous acid solution buffered at about pH 5.5, suitably from about pH 5 to about pH 6 with a buffer salt, advantageously sodium citrate, whereby the erythromycin free base in the amyl acetate solution is converted to an erythromycin salt which is taken up in the aqueous phase. The aqueous phase is then neutralized to liberate erythromycin free base, i.e., the pH is adjusted to about pH 9.5 and simultaneously extracted with methylene chloride. The methylene chloride solution is ordinarily dry enough so that it need not be dried. Drying, however, can be effected if desired by distilling off some of the methylene chloride or by contact with anhydrous sodium sulfate. Advantageously methylene chloride is distilled to concentrate the solution, say to about ten to fifty percent of saturation, or so, depending upon the anhydride to be used. The solution is then assayed for erythromycin and an equivalent amount of succinic or glutaric anhydride, or like dicarboxylic inner anhydride, is added. The formed acid ester is allowed or caused to crystallize and the crystals filtered off on a filter press or with a centrifuge and washed with methylene chloride. There is thus obtained a specification grade erythromycin acid ester which can be converted to specification grade erythromycin free base or salt thereof by alkaline hydrolysis.

The first solvent (amyl acetate) is selected primarily on a basis of its ability to extract erythromycin free base from a dilute aqueous solution. Other like water-immiscible polar solvents can be used, such including alkyl esters of fatty acids, for example, ethyl acetate and butyl acetate; chlorinated hydrocarbons, for example, chloroform and ethylene dichloride; alcohols having slight water-solubility, for example, butanol and amyl alcohol; ketones of slight water-solubility, for example, methyl amyl ketone; and ethers, for example, diethyl ether, and dibutyl ether. The second solvent may be selected on the same basis. Ordinarily it should be a different solvent from the first so that benefit can be had of a change of solvents. Since the erythromycin is to be recovered as erythromycin acid ester, it is additionally desirable that the second solvent have a high temperature coefficient of solubility for the acid ester in order that effective crystallization of the erythromycin acid ester can be obtained on cooling the solution. Methylene chloride has been found especially advantageous in this respect. However, other of the water-immiscible solvents noted above can be used, especially the chlorinated lower aliphatic hydrocarbons.

Also other solvent extraction procedures can be used. Thus the process of the invention can be applied directly to the amyl acetate extract or to a like single solvent extract with another solvent, e.g., methylene chloride.

The following examples are illustrative of the process and products of the invention, but are not to be construed as limiting.

EXAMPLE 1

A fifty-mil aliquot of a plant-run methylene chloride extract assaying 0.09 gram/mil of erythromycin was filtered and diluted to sixty mils with methylene chloride. A solution of 0.94 gram (9.4 millimoles) of succinic anhydride in 25 mils methylene chloride (obtained by stirring 1.0 gram of 94 percent succinic anhydride-six percent succinic acid in 25 mils methylene chloride and filtering) was added, with stirring. Precipitation occurred soon thereafter (ten to fifteen minutes) and stirring was continued for 2.5 hours. After standing overnight the product was filtered, washed well with methylene chloride and dried to constant weight at fifty degrees centigrade in vacuo. A substantially quantitative yield of erythromycin acid succinate was obtained, having a melting point of 148–152 degrees centigrade and an optical rotation of $[\alpha]_D^{23}$ minus 79 degrees (95 percent ethanol).

The plant-run methylene chloride solution used in this and subsequent Examples 2 through 5 was obtained by successive transfers of erythromycin from clear beer to amyl acetate to a buffered aqueous solution to methylene chloride. Whole fermentation beer was heated to 140 degrees Fahrenheit for twenty minutes, cooled to 86 degrees Fahrenheit, treated with a filter aid, and then filtered and polished. The clear beer was then adjusted to pH 10.2–10.4 and extracted with amyl acetate. The amyl acetate solution was then extracted with an 0.15 M citrate buffer solution, prepared by dissolving 179 pounds of sodium citrate dihydrate (U.S.P.) and 26.6 pounds of anhydrous citric acid (U.S.P.) in 600 gallons of water to give a solution having a pH of 5.5. The rich buffer solution was then extracted with methylene chloride with concurrent adjustment of the pH by the addition of 0.6 M sodium carbonate solution to pH 8.5–9.5. The methylene chloride solution was then filtered through a sterile filter.

EXAMPLE 2

On substituting 2.25 grams of phthalic anhydride for the succinic anhydride of Example 1 and using an eighty-mil aliquot of the plant-run methylene chloride solution, a clear solution was obtained. The solution was stirred for three hours without any precipitate forming, at the end of which time cyclohexane was added until the solution became hazy (about seventy mils of cyclohexane was required for this purpose). In two hours precipitation had occurred. The precipitate was filtered off, washed with a mixture of two-volume parts cyclohexane and one-volume part methylene chloride and then with cyclohexane. After drying in vacuo at room temperature and standing overnight there was obtained 7.32 grams of crystals melting at 156–158 degrees centigrade. The filtrate was concentrated to yield 1.22 grams of a second crop of crystals melting at 149–152 degrees centigrade.

EXAMPLE 3

On substituting 1.25 grams of maleic anhydride for the succinic anhydride of Example 1 and using an eighty-mil aliquot of the plant-run methylene chloride solution, a precipitate formed after about two hours. The precipitate formed was filtered off, washed with methylene chloride, and dried at fifty degrees centigrade in vacuo. There was obtained 7.58 grams of crystals melting at 158–162 degrees centigrade.

EXAMPLE 4

Δ⁴-cis-Tetrahydrophthalic anhydride (1.15 grams) was substituted for the succinic anhydride of Example 1 and the reaction mixture was allowed to stand overnight. The precipitate was filtered off, washed with methylene chloride, and dried in vacuo at fifty degrees centigrade. There was obtained 4.9 grams of crystals melting at 151–156 degrees centigrade.

EXAMPLE 5

Hexahydrophthalic anhydride (2.3 grams) was substituted for the maleic anhydride of Example 3 and after stirring for 1.5 hours, the precipitate formed was filtered off, washed with methylene chloride and dried in vacuo at fifty degrees centigrade. There was obtained 8.45 grams of crystals melting at 148–153 degrees centigrade.

EXAMPLE 6

A 460-mil aliquot of a plant-run methylene chloride solution of erythromycin obtained as in Example 1 but assaying 457 grams of erythromycin per gallon and yielding 352 grams of specification grade erythromycin per gallon by crystallization was treated as follows. To this aliquot, the erythromycin content of which was calculated to be 55.5 grams (0.075 mole), was added with stirring twelve grams (0.105 mole) of glutaric anhydride. The reaction mixture was stirred one hour and allowed to stand overnight; some crystals were present. The mixture was concentrated under slightly reduced pressure to about 200 mils, during which procedure more crystallization occurred, and was then cooled to five degrees centigrade and allowed to stand for three hours. The erythromycin acid glutarate was recovered by filtration, washed with two 25-mil portions of cold methylene chloride, and dried in vacuo at fifty degrees centigrade. There was thus obtained 55.5 grams of product having a melting point of 128–132 degrees centigrade and an $[\alpha]_D^{23}$ minus 66 degrees (95 percent ethanol).

It is calculated that had the above plant-run methylene chloride solution of erythromycin been converted to erythromycin acid glutarate by the procedure of this example, there would have been obtained 457 grams of the acid ester per gallon. This weight of ester is equivalent of 396 grams of erythromycin per gallon. The process of the invention therefore nets an additional 44 grams of erythromycin equivalent per gallon.

EXAMPLE 7

β-Methylglutaric anhydride (3.2 grams) was substituted for the glutaric anhydride of Example 6 using a 123-mil aliquot of the plant-run methylene chloride solution of Example 6. After stirring fifteen minutes, a clear solution was obtained. The solution was filtered to remove a small amount of extraneous material and then allowed to stand overnight. The solution was concentrated to half volume, cooled to five degrees centigrade, filtered and washed with cold methylene chloride. After drying at fifty degrees centigrade in vacuo the product weighed 10.65 grams and melted at 125–8 degrees centigrade, $[\alpha]_D^{23}$ minus 66 degrees (95 percent ethanol). Analysis: C, 58.08, 58.07; H, 8.70, 8.56; N, 1.76.

The procedure of the foregoing examples can be utilized advantageously to upgrade impure erythromycin. Thus erythromycin which is in such impure condition that it cannot readily or economically be purified by the techniques heretofore available, can be treated in accordance with this invention to obtain simply and effectively a specification grade product. The following examples are illustrative.

EXAMPLE 8

The erythromycin used in this example was material which could not be purified to give acceptable material. It had an optical rotation of $[\alpha]_D^{23}$ minus 71 degrees in 95 percent ethanol.

A solution of 0.56 gram (0.56 millimole) of succinic anhydride in twenty mils of methylene chloride (prepared as above by stirring 0.60 gram 94 percent succinic anhydride-six percent succinic acid with the methylene chloride and filtering) was added to a solution of 3.6 grams of the low-grade erythromycin in thirty mils methylene chloride, with stirring. After stirring fifteen minutes, product had started to precipitate. The mixture was stirred two hours and allowed to stand overnight at room temperature. The product was filtered off, washed well with methylene chloride and dried at fifty degrees centigrade in vacuo to constant weight. The product weighed 3.89 grams (95 percent yield), had melting point of 148–152 degrees centigrade and an optical rotation of $[\alpha]_D^{23}$ minus 79 degrees (95 percent ethanol). The $[\alpha]_D^{23}$ was identical with that of the product obtained in Example 1 and infrared analysis showed the compounds to be identical.

EXAMPLE 9

One hundred grams of sub-specification grade erythromycin, having $[\alpha]_D^{23}$ minus 71 degrees in 95 percent ethanol, was slurried with 350 mils of methylene chloride. To this slurry 17.8 grams of glutaric anhydride was added with stirring. Within about twenty minutes a clear solution was obtained and the temperature rose to about 35 degrees centigrade. Soon thereafter precipitation of erythromycin acid glutarate began. The mixture was stirred an additional fifteen hours, cooled to five degrees centigrade, and filtered, and the product was washed twice with 75-mil portions of cold methylene chloride. The product, after being dried at fifty degrees centigrade under reduced pressure, weighed about 104 grams and had substantially the same physical constants as the product obtained in Example 6.

The procedures of the foregoing examples can also be utilized effectively to recover erythromycin base simply by subjecting the recovered erythromycin acid ester to alkaline hydrolysis.

The following examples are illustrative of the use of other dicarboxylic inner anhydrides:

EXAMPLE 10

*Erythromycin acid octenylsuccinate*

A solution of 7.2 grams (ten millimoles) erythromycin and 2.6 grams (12.5 millimoles) of octenylsuccinic anhydride in sixty mils of methylene chloride was stirred for one hour and then allowed to stand overnight. On dilution with an equal volume of anhydrous diethyl ether, a precipitate formed and was filtered off, washed with anhydrous diethyl ether, and dried in vacuo at fifty degrees centigrade. There was obtained 2.15 grams (23 percent yield) of crystals melting 120–123 degrees centigrade.

The octenylsuccinic anhydride is obtained by condensing diisobutylene with maleic anhydride. In place of diisobutylene there can be used other olefins such as propylene, isobutylene, their dimers and trimers, and like olefins, and the alkenylsuccinic anhydrides so obtained, can be condensed with erythromycin to form the corresponding erythromycin acid alkenylsuccinates, as in the above example.

EXAMPLE 11

*Erythromycin acid diglycolate*

After stirring for one hour a solution containing 3.6 grams (five millimoles) erythromycin and 0.58 gram (five millimoles) of diglycolic anhydride in fifty mils of methylene chloride, the precipitate formed was filtered off, washed in methylene chloride, and dried in vacuo at fifty degrees centigrade. There was obtained 2.25 grams (53 percent yield) of crystals melting 153–157 degrees centigrade.

EXAMPLE 12

*Erythromycin acid naphthalate*

A solution of 3.6 grams (five millimoles) of erythromycin in 100 mils of methylene chloride was placed in the pot of a Soxhlet extractor and 1.25 grams (6.23 millimoles) of naphthalic anhydride (naphthalene-1,8-dicarboxylic acid anhydride) was placed in the thimble. Extraction was carried out for six hours in boiling methylene chloride. The solvent was removed in a stream of air and the residue triturated repeatedly with anhydrous diethyl ether. There was obtained 1.03 grams (22 percent yield) of a brownish tan product melting indefinitely at about 155–160 degrees centigrade.

EXAMPLE 13

*Erythromycin acid camphorate*

A solution of 1.37 grams (7.5 millimoles) of dl-camphoric anhydride and 3.6 grams (five millimoles) of erythromycin in 35 mils of methylene chloride was stirred four hours at room temperature. The solution was evaporated to dryness, triturated repeatedly with isopropyl ether and dried at fifty degrees centigrade in vacuo. There was obtained 2.0 grams (22 percent yield) of a product melting indefinitely at 105–130 degrees centigrade.

Other dicarboxylic inner anhydrides listed above can be utilized in the foregoing examples to prepare the corresponding erythomycin esters.

It is to be understood that the invention is not to be limited to the exact details of operation or exact compounds shown and described, as obvious modificaions and equivalents will be apparent to one skilled in the art, and the invention is therefore to be limited only by the scope of the appended claims.

I claim:

1. The process of purifying erythromycin which comprises preparing a substantially anhydrous solution of impure erythromycin free base in methylene chloride, adding thereto at least one equivalent of a lower dicarboxylic inner anhydride capable of reacting with active hydroxyl hydrogen to form an acid ester which is insoluble in methylene chloride, and separating the thus-formed and precipitated erythromycin acid ester therefrom.

2. The process which comprises extracting erythromycin free base from a fermentation beer containing the same into an inert organic solvent, extracting erythromycin salt into an aqueous solution by contacting the organic solvent extract with an acid aqueous solution, neutralizing the aqueous solution thus obtained to liberate erythromycin free base and simultaneously extracting erythromycin free base therefrom into another inert organic solvent, adding to the second organic solvent extract, under substantially anhydrous conditions, a dicarboxylic inner anhydride, and separating the thus-formed erythromycin acid ester therefrom.

3. The process of claim 1 in which the lower dicarboxylic inner anhydride is the inner anhydride of a saturated dicarboxylic acid having from four to eight carbon atoms.

4. The process of claim 1 in which the lower dicarboxylic inner anhydride is succinic anhydride.

5. The process which comprises extracting erythromycin free base from a fermentation beer containing the same into amyl acetate, extracting erythromycin salt into an aqueous solution by contacting the amyl acetate extract with an acid solution, extracting erythromycin free base from said aqueous solution into methylene chloride, adding to the methylene clhoride extract, under substantially anhydrous conditions, at least one equivalent of a dicarboxylic inner anhydride of a saturated dicarboxylic acid containing from four to eight carbon atoms, to form erythromycin acid ester as a precipitate, and separating the thus formed erythromycin acid ester therefrom.

6. The process of claim 5 in which the dicarboxylic inner anhydride is succinic anhydride.

7. The process of purifying erythromycin which comprises preparing a substantially anhydrous solution of impure erythromycin free base in methylene chloride, adding thereto at least one equivalent of a lower dicarboxylic inner anhydride capable of reacting with active hydroxyl hydrogen to form an acid ester, which is insoluble in methylene chloride, separating the thusformed and precipitated erythromycin acid ester from said solution, hydrolyzing the separated ester by alkaline hydrolysis, and recovering purified erythromycin free base therefrom.

8. The process which comprises extracting erythromycin free base from a fermentation beer containing the same into a water-immiscible organic solvent for erythromycin, extracting erythromycin salt into an aqueous solution by contacting the organic solvent extract with an aqueous acid solution, extracting erythromycin free base from said aqueous solution into methylene chloride, adding to the methylene chloride extract, under substantially anhydrous conditions, a lower dicarboxylic inner anhydride, to form erythromycin acid ester as a precipitate, and separating the thus-formed erythromycin acid ester therefrom.

9. The process which comprises extracting erythromycin free base from a fermentation beer containing the same into amyl acetate, extracting the erythromycin salt into an aqueous solution by contacting the amyl acetate extract with an aqueous acid solution, extracting the erythromycin free base from said aqueous solution into methylene chloride, adding to the methylene chloride extract, under substantially anhydrous conditions, a dicarboxylic inner anhydride, to form erythromycin acid ester as a precipitate, separating the thus-formed erythromycin acid ester, and recovering purified erythromycin free base therefrom.

10. The process which comprises extracting erythromycin free base from a fermentation beer containing the same into amyl acetate, extracting the erythromycin salt into an aqueous solution by contacting the amyl acetate extract with an aqueous acid solution, extracting erythromycin free base from said aqueous solution into methylene chloride, adding to the methylene chloride extract, under substantially anyhdrous conditions, at least one equivalent of succinic anhydride, to form erythromycin acid ester as a precipitate, separating the thus-formed erythromycin acid ester, and recovering purified erythromycin free base therefrom.

11. A process for purifying erythromycin which comprises preparing a substantially anhydrous solution of impure erythromycin free base in methylene chloride, adding thereto at least one equivalent of succinic anhydride to precipitate erythromycin acid ester, and without the addition of heat, separating the thus-formed and precipitated erythromycin acid ester.

12. A process for purifying erythromycin which comprises extracting erythromycin free base from a fermentation beer containing the same into amyl acetate, extracting erythromycin salt into an aqueous solution by contacting said amyl acetate extract with an aqueous acid solution, extracting erythromycin free base from said aqueous solution into methylene chloride, adding to said methylene chloride extract under substantially anhydrous conditions succinic anhydride to precipitate erythromycin acid ester, and without the addition of heat, separating the thus-formed and precipitated erythromycin acid ester.

References Cited in the file of this patent

UNITED STATES PATENTS

| | | |
|---|---|---|
| 2,483,885 | Crooks et al. | Oct. 4, 1949 |
| 2,501,014 | Wintersteiner et al. | Mar. 21, 1950 |
| 2,560,891 | Regna et al. | July 17, 1951 |
| 2,653,899 | Bunch et al. | Sept. 29, 1953 |
| 2,662,906 | Edgerton | Dec. 15, 1953 |
| 2,857,312 | Stephens | Oct. 21, 1958 |

OTHER REFERENCES

Sylvester et al.: Sec. Ann. Sym. on Antibiotics, October 1954, Paper No. 41.